Figure 1:
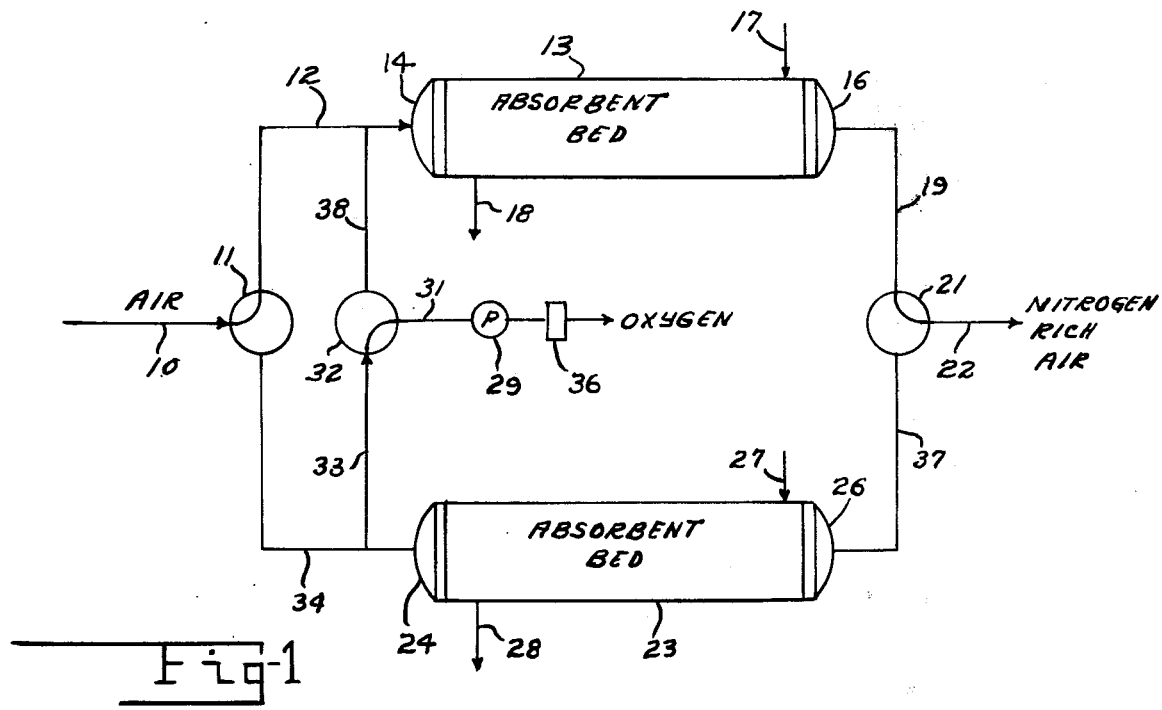

United States Patent [19]

Fox, Jr.

[11] 4,011,306

[45] Mar. 8, 1977

[54] OXYGEN GENERATION METHOD

[75] Inventor: William B. Fox, Jr., West Carrollton, Ohio

[73] Assignee: The United States of America as represented by the Secretary of the Air Force, Washington, D.C.

[22] Filed: Feb. 26, 1976

[21] Appl. No.: 661,581

[52] U.S. Cl. .................... 423/579; 252/411 R
[51] Int. Cl.² .................................. C01B 13/02
[58] Field of Search .................. 423/579, 219; 252/411 R; 55/74

[56] References Cited
UNITED STATES PATENTS 2,450,276  9/1948  Fogler et al. ............... 423/579

OTHER PUBLICATIONS

Calvin et al., "J. Am. Chem. Soc.", vol. 68, 1946, pp. 2254–2256.
Barkelew et al., "J. Am. Chem. Soc.", vol. 68, 1946, pp. 2257–2262.
Wilmarth et al., "J. Am. Chem. Soc.", vol. 68, 1946, pp. 2263–2266.

*Primary Examiner*—Edward J. Meros
*Attorney, Agent, or Firm*—Joseph E. Rusz; Cedric H. Kuhn

[57] ABSTRACT

In the generation of oxygen using bis(3-fluorosalicylal-)ethylenediimine cobalt (II) as the oxygen absorbent, the absorbent is heated to 340° to 390° F for 15 to 30 minutes while purging with air. This treatment before and after cyclic use removes volatilizable inert materials, i.e., those that do not absorb oxygen, and thus makes oxygen sites available to oxygen.

9 Claims, 2 Drawing Figures

OXYGEN GENERATION METHOD

RIGHTS OF THE GOVERNMENT

The invention described herein may be manufactured and used by or for the Government of the United States for all governmental purposes without the payment of any royalty.

FIELD OF THE INVENTION

This invention relates to a method for generating oxygen using a cobalt chelate as the oxygen absorbent. In one aspect it relates to a method for generating oxygen wherein the oxygen absorbent is treated before and after use to remove volatilizable inerts.

BACKGROUND OF THE INVENTION

Solid absorbents capable of removing oxygen from air are being considered for on-board oxygen generation systems for aircraft. Among the compounds suggested for use are certain cobalt chelates, particularly bis(3-fluorosalicylal)ethylenediimine cobalt (II). While the cobalt chelate has the capability of absorbing and desorbing oxygen, volatilizable inert materials are formed under the conditions prevailing during the absorb-desorb cycles. These inerts occupy oxygen sites, a condition which renders a portion of the absorbent unsuitable for further use. Furthermore, the processing conditions under which the cobalt chelate is prepared are condusive to the formation of volatilizable inert materials. As a result, oxygen sites of the material after manufacture are occupied by volatilizable inerts, thereby decreasing the capability of the cobalt chelate to absorb and desorb oxygen.

It is an object of this invention, therefore, to provide an improved method for generating oxygen.

Another object of the invention is to provide a method whereby volatilizable inerts are removed from a cobalt chelate oxygen-absorbent prior to and after use in the generation of oxygen.

Figure 2:
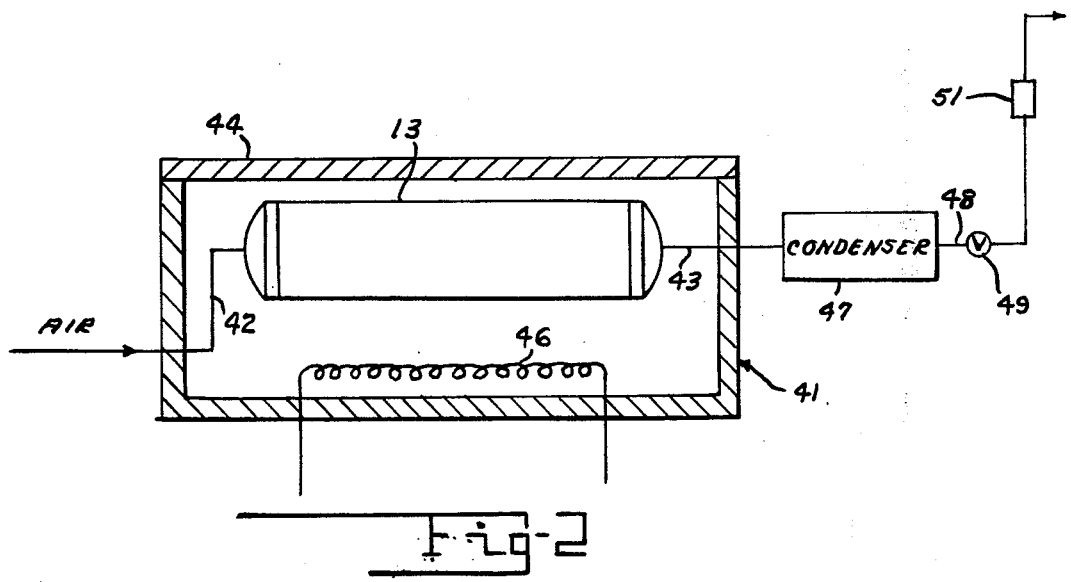

Other objects and advantages of the invention will become apparent to those skilled in the art upon consideration of the accompanying disclosure and the drawing, in which:

FIG. 1 is a flow diagram illustrating a system for the generation of oxygen; and FIG. 2 is a schematic representation of apparatus suitable for treating the cobalt chelate absorbent.

SUMMARY OF THE INVENTION

The present invention resides, at least in part, upon the discovery that bis(3-fluorosalicylal)ethylenediimine cobalt (II) as prepared and after use as an oxygen absorbent contains volatilizable inerts. These volatilizable inerts occupy oxygen sites, thereby decreasing the capacity of the cobalt chelate absorbent to absorb and desorb oxygen. In one embodiment, therefore, this invention is concerned with a method for treating the cobalt chelate containing volatilizable inerts that comprises the step of heating a bed of the cobalt chelate at a temperature ranging from about 340° to 390° F for a period of about 15 to 30 minutes while purging the bed with air or nitrogen, or by pulling a vacuum on the bed.

In a more specific embodiment, the present invention resides in a method for the generation of oxygen. In accordance with the method, dry air is passed through a bed of the cobalt chelate that is cooled by a coolant maintained at a temperature ranging from about 30° to 70° F. When the absorbent bed is in a heated condition after being desorbed of oxygen as described below, circulation of the coolant in indirect heat exchange with the bed results in it being cooled to a temperature below about 100° F, e.g., to a temperature ranging from about 90° to 100° F. Oxygen in the air is absorbed by the cobalt chelate and air rich in nitrogen is removed as an effluent from the absorbent bed. After about 3 to 5 minutes, the supply of air is terminated and the bed is now heated under a vacuum by a heating fluid at a temperature ranging from about 250° to 260° F for a period of about 3 to 5 minutes. As a result of the heating fluid passing in indirect heat exchange with the absorbent bed, it is heated to a temperature above about 200° F, e.g., to a temperature in the range of about 210° to 220° F. During this period the cobalt chelate desorbs oxygen. The absorb-desorb cycle is repeated for a period of about 200 to 300 hours or until the capacity of the cobalt chelate to absorb oxygen has decreased to about 50 percent. When the capacity of the absorbent has decreased to about 50 percent as a result of the formation of volatilizable inert reaction products, it is usually considered to be no longer practical to continue the absorb-desorb cycles because of low oxygen output. However, it is to be understood that the absorb-desorb cycles can be conducted until the capacity of the absorbent bed to absorb oxygen decreases to any desired level, e.g., to about 25 to 80 percent. The absorbent bed is then treated to remove volatilizable inerts by heating the bed at a temperature ranging from about 340° to 390° F for a period of about 15 to 30 minutes while continuously removing the volatilizable inerts by purging the bed with air or nitrogen or by pulling a vacuum on the bed.

As a result of the removal of the volatilizable inerts, the capacity of the bed to absorb oxygen is increased by about 15 percent. It is now practical to continue the absorb-desorb cycle until such time as the capacity of the absorbent is again reduced to about 50 percent. It is also within the scope of the invention to treat the cobalt chelate prior to its use as an absorbent. It has been found that as-prepared cobalt chelate absorbent contains volatilizable inerts, the removal of which may increase the capacity of the material to absorb oxygen by as much as 6 percent.

In the foregoing description, the invention has been described with relation to the use of bis(3-fluorosalicylal)ethylenediimine cobalt as the oxygen absorbent. This compound has the following structural formula:

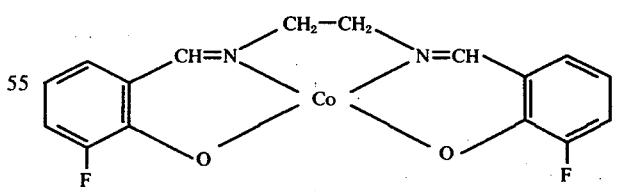

Although it is preferred to use this compound as the absorbent, it is also within the purview of the invention to employ bis(salicylal)ethylenediimine cobalt (II). This latter compound has the same structural formula as shown above except that it is not fluorinated.

Referring now to the drawing, there is shown in FIG. 1 a flow diagram of a system suitable for generating oxygen on board an aircraft. Engine bleed air or air from any suitable source, which has been dried by passage through a desiccator, not shown, is supplied to the system through line 10. The dry air at a pressure of about 20 to 50 psi enters two-way valve 11 and, as indicated, is directed into line 12 through which it flows into cylindrical container 13 in which an absorbent bed is disposed. In the preferred embodiment, bis(3-fluorosalicylal)ethylenediimine cobalt (II) in particulate form is utilized as the absorbent. In forming the absorbent bed, the cobalt chelate is conveniently packed into a plurality of tubes extending the length of container 13. The ends of the tubes are positioned in holes formed in circular end plates disposed at and sealingly fitted, as by welding, into each end of container. The ends of the container are enclosed by dome-shaped closure members 14 and 16 which for ease of removal are threaded onto the container ends. The absorbent containers are preferably in the form of a plate-fin type heat exchanger with passages extending one way packed with absorbent and with cross flow passages containing the alternate cooling and heating fluid.

As the air flows through the absorbent bed in container 13, oxygen is absorbed from the air by the cobalt chelate absorbent. During this absorb cycle, which lasts from about 3 to 5 minutes, the absorbent bed is cooled by a coolant maintained at a temperature ranging from about 30° to 70° F. This is accomplished by circulating a coolant, such as ethylene glycol, through container 13 in indirect heat exchange with the absorbent bed. The coolant enters container 13 through line 17 and is discharged through line 18. As a result of the oxygen absorption by the cobalt chelate, nitrogen rich air is withdrawn from container 13 through line 19. The nitrogen rich air stream enters two-way valve 21 and, as indicated, is directed into line 22 from which the stream is vented.

Container 23 having end closure members 24 and 26 is identical to container 13. However, for convenience of description, it is assumed that its absorbent bed has previously undergone an absorb cycle as described above so that its bed contains absorbed oxygen. Accordingly, during the period when the absorbent bed in container 13 is absorbing oxygen, the absorbent bed in container 23 is desorbing oxygen. In other words the absorption of oxygen in one bed is carried on simultaneously with the desorption of oxygen from the other bed. The desorption of oxygen from the cobalt chelate absorbent in container 23 is accomplished by heating the absorbent bed with a heating fluid at a temperature ranging from about 250° to 260° F. Heating of the absorbent bed is carried out by circulating a heating fluid, such as ethylene glycol, through container 23 in indirect heat exchange with the bed. The heating fluid enters container 23 through line 27 and is discharged through line 28.

The desorbed oxygen is removed from the absorbent bed in container by means of vacuum pump 29 positioned in line 31. To this end, line 31 is connected by two-way valve 32, as indicated, to line 33 which is connected to line 34 through which the oxygen leaves container 23. Positioned in line 31 is a flow meter which gives an indication of the rate of flow of desorbed oxygen. The oxygen recovered through line 31 is passed to suitable containers where it is stored for use by the crew of the aircraft.

Upon completion of the absorb and desorb cycle, which as previously mentioned lasts from about 3 to 5 minutes, two-way valves 11, 21, and 32 are each changed to their alternate position. As a result of these changes, lines 10, 37 and 38 now communicate, respectively, with lines 34, 22 and 31. Dry air entering the system through line 10 now passes through line 34 into container 23 wherein oxygen is absorbed by the cobalt chelate absorbent. A coolant maintained at about 30° to 70° F is introduced into the container through line 27 and withdrawn through line 28. A nitrogen rich air stream withdrawn from container 23 by line 37 is vented through line 22.

Simultaneous with the absorption of oxygen as described in the preceding paragraph, oxygen is desorbed from the absorbent bed in container 13. The desorption of oxygen is accomplished by heating the bed with a 250° to 260° F heating fluid circulated through the container. The heating fluid is charged to the container through line 17 and withdrawn through line 18. The desorbed oxygen is pumped from the absorbent bed in container 13 through lines 12 and 38 by means of vacuum pump 29 in line 31. After flowing through flow meter 36, the oxygen is passed to storage as previously mentioned.

The above described cycle of operation occurs every 3 to 5 minutes so that oxygen is produced in a continuous manner. The two-way valves are preferably operatively connected to a timing device in a manner well known in the art so that the valves operate on a timed cycle. The function of the absorbent beds in absorbing and desorbing oxygen is thereby changed automatically.

It has been determined that the equilibrium oxygen contents of the solid portion of fresh, i.e., uncycled, cobalt chelate absorbent responsible for oxygen absorption is 0.043 gram of oxygen per gram of absorbent. During the cycling operation, the oxygen absorption capacity and production rate decreases. This decrease is due at least in part to the formation of volatilizable inert reaction products which occupy normal oxygen sites. When the absorbent has degraded to about 50 percent, i.e., to an equilibrium content of 0.0215 gram of oxygen per gram of absorbent, it is considered to be no longer feasible from the standpoint of efficient oxygen production to continue the absorb-desorb cycling. A period ranging from about 200 to 300 hours is usually required to reach the condition at which the absorbent is 50 percent degraded. The point in time at which the cycling should be terminated can be determined by observing flow meter 36 in line 31.

Upon completion of the absorb-desorb cycling, the system is closed down by shutting off the air supply, the vacuum pump and the flow of heat exchange fluids. The various lines connected to containers 13 and 23 are then detached so that the containers can be removed from the system. The absorbent beds in the containers are then treated as described hereinafter so as to remove volatilizable inerts.

Referring now to FIG. 2, apparatus is illustrated that is used in the treatment of the absorbent beds to remove volatilizable inerts. As shown, container 13, which has been removed as mentioned above from the system of FIG. 1, is suspended in oven 41 by being attached to lines 42 and 43. The container's inlet and outlet for heat exchange fluid are capped by the insertion of plugs (not shown). The oven has a removable closure member 44 so as to provide ready access to its interior.

The absorbent bed is maintained at a temperature ranging from about 340° to 390° F for a period of about 15 to 30 minutes. A temperature of 390° F for 30 minutes is preferred. The oven is heated by means of heating coil 46 located adjacent its bottom. During the heating operation, the absorbent bed is purged with air supplied by an air compressor (not shown) through line 42 so as to remove the volatilizable inerts. While it is preferred to employ air, it is within the scope of the invention to use an inert gas, such as nitrogen or to pull a vacuum on the container. It is critical that the absorbent bed be purged with air at any time the oven temperature is 250° F or higher. If this purge procedure is not followed, it has been found that the cobalt chelate becomes completely degraded. An air purge velocity of about 3 feet per minute through the absorbent bed is usually satisfactory. This velocity is equivalent to a mass velocity of about 14 lbs air/hr(ft$^2$) where (ft$^2$) is the cross sectional or frontal area of the absorbent bed.

The volatilizable inerts contained in the absorbent are volatilized by the heating and are purged from the bed by the air. As a result, a stream of air containing voltilized inerts leaves container 13 and oven 41 through line 43 and enter condenser 47. The condenser is conveniently in the form of a cylinder having removable end closure members and packed with wire screening. Since the condenser is at about room temperature, the voltilized inerts condense on the wire screening. The purge air leaves the condenser through line 48, and after passing through valve 49 and flow meter 51 is vented. By observing the flow meter, it is possible to determine whether sufficient purge air is flowing through the absorbent bed.

At the end of the treatment or activation period, the oven is allowed to cool while still purging with air until the temperature is below 250° F. The flow of purge air can then be terminated and container 13 removed from the oven. Container 23 is then placed in the oven, and its absorbent bed is subjected to the treatment as described above with relation to the absorbent bed of container 13. If necessary to ensure the efficient condensation of the volatilized inerts, the wire screening in condenser 47 can be replaced with new screening.

After the treatment of the absorbent beds of both containers has been completed, the containers can be replaced in the system of FIG. 1 and used again in the generation of oxygen. It has been found that the described treatment of the absorbent beds increases their capacity to absorb oxygen by about 15 percent, thereby making it feasible to reuse the beds. The containers whose beds have undergone treatment can also be used as stand-bys to replace other containers employed in oxygen generation while they were being activated.

A more comprehensive understanding of the invention can be obtained by referring to the following illustrative examples which are not intended, however, to be unduly limitative of the invention.

EXAMPLE I

A cobalt chelate absorbent, namely, bis(3-fluorosalicylal)-ethylenediimine, as received from the supplier, was packed into a long straight glass tube. The tube was placed in a 380° F and 1 atmosphere oven; there was no provision for purging the tube with air. The tube remained in the oven for 20 minutes, and during this period the color of the absorbent changed from a brown to a red color. This color change indicated that the absorbent had completely degraded. As a result the absorbent no longer had the capacity to absorb oxygen.

EXAMPLE II

A run was carried out in which the same cobalt chelate absorbent used in Example I was packed into a glass U-tube. The absorbent was held in place in the tube with Fiberglas packing. The U-tube was placed in a 380° F oven with the inlet and outlet of the tube extending through the cracked oven door. One of the tube ends was connected to a source of purge air while the other tube end was connected to a hose inserted into a beaker of water. The U-tube remained in the oven at 380° F for 20 minutes. No color change in the absorbent was observed, indicating that there was no degradation. Volatilized inerts were given off and they condensed in the cool portion of the U-tube outside of the oven. While still purging with air, the oven was allowed to cool after which the U-tube was removed.

The condensed volatilized inerts were a yellow, waxlike material which would not vaporize to any extent when heated at 380° F and 1 atmosphere for 20 minutes. Analysis of the material indicated that it was composed of at least three compounds which appeared to be the reaction products of 3-fluorosalicyclaldehyde.

After removal of volatilizable inerts as described above, the absorbent was subjected to the static oven conditions which normally result in sudden degradation, i.e.; 380° F and 1 atmosphere. However, because of the removal of the volatilizable inerts, sudden degradation did not occur.

EXAMPLE III

A run is conducted in which a system similar to that illustrated in FIG. 1 is employed to generate oxygen. Prior to packing the cobalt chelate into the containers, it is distributed in trays in a thin layer of less than ½ inch, and placed in a vacuum oven maintained at 390° F. The absorbent is allowed to remain in the oven for about 30 minutes with a pressure maintained at 1 to 3 mm Hg absolute. The absorbent is then removed from the oven and allowed to cool. Volatilized inerts are removed and collected in the oven's vacuum system. Maximum oxygen absorption rate is obtained if fresh uncycled absorbent is heated under vacuum conditions while removing volatilizable inerts. This is an alternate procedure for pretreating uncyled cobalt chelate; the pretreatment can also be conducted in the apparatus of FIG. 2.

Each container is packed with 5 pounds of the cobalt chelate pretreated as described above.

Initially, dry air at about 30 psi pressure is passed through the absorbent bed in the first container for a period of 4 minutes. During this period, the bed is cooled by circulating ethylene glycol maintained at a temperature of about 50° F in indirect heat exchange therewith. A nitrogen rich air stream is withdrawn from the first container and vented.

The two-way valves are now positioned so that dry air at 30 psi pressure is supplied to the second container, the outlet line of the second container is connected to the nitrogen rich air vent line, and the line containing the vacuum pump is connected to the first container. The absorbent bed of the first container is heated by circulating 255° F ethylene glycol in indirect heat exchange therewith. Oxygen is desorbed as a result of the heating and is pumped to storage by the vacuum pump. Simultaneously with the aforementioned sequence of events dry air at a pressure of 30 psi is passed into the absorbent bed of the second container. The absorbent bed is cooled with ethylene glycol maintained at about 50° F by circulating same in indirect heat exchange therewith. Oxygen in the air is absorbed by the absorbent bed, and the nitrogen rich air withdrawn from the second container is vented.

After a period of 4 minutes, the two-way valves are changed to their alternate position. Now the absorbent bed in the first container absorbs oxygen while the absorbent bed in the second container desorbs oxygen. At 4 minute intervals thereafter, the two-way valves are operated so that the absorbent beds function alternately as oxygen absorber and oxygen desorber.

The absorbent beds become about 50 percent degraded after about 250 hours as indicated by the flow meter in the oxygen recovery line. The system is then shut down by turning off the supply of air and stopping the vacuum pump. Thereafter, the two containers are removed from the system.

The absorbent beds in the two containers are next treated in apparatus similar to that shown in FIG. 2. The first container with its heat exchange fluid inlet and outlet plugged is suspended in the oven by being attached to the purge air inlet and outlet lines. The oven is heated to and maintained at 390° F while supplying purge air to the container. The velocity of purge air through the absorbent bed is about 3 ft/min. An air stream containing volatilized inerts passes from the container into the air cooled condenser where the volatilized inerts condense on the wire screening. After 30 minutes the oven is allowed to cool while purging with air until the temperature falls below 250° F. The first container now free of volatilizable inerts is removed from the oven and replaced with the second container. The second container is then subjected to the same treatment as the first container. The two containers are now placed in the system of FIG. 1 and again employed to generate oxygen.

In order to determine the amount of inerts condensed in the condenser, the wire screening is weighed before and after the treatment of the absorbent beds in the two containers. It is thus determined that the two 5-pound beds contained a total of about ½ pound of volatilizable inerts. This indicates that the 50 percent degraded absorbent contains about 5 percent volatilizable inerts.

By activating or treating the absorbent bed as described above, the capacity of the bed to absorb oxygen in an oxygen generation method is substantially increased. Furthermore, as a result of removal of volatilizable inerts in the activation, sudden degradation of the absorbent is prevented or minimized. Also, as a result of the activation, the amount of volatilized impurities in the oxygen product is reduced.

As will be evident to those skilled in the art, modifications of the present invention can be made without departing from the spirit and scope of the invention.

I claim:

1. In a method of generating oxygen wherein bis(3-fluorosalicylal)ethylenediimine cobalt (II) is used as the oxygen absorbent and during absorption and desorption of oxygen volatilizable inert materials form in the absorbent and occupy oxygen sites, the improvement which comprises heating the oxygen absorbent containing volatilizable inert materials in a heating zone at a temperature ranging from about 340° to 390° F for a period of about 15 to 30 minutes, thereby volatilizing the inert materials; and continuously removing volatilized inert materials from the heating zone during the heating period.

2. The improvement in accordance with claim 1 in which the volatilized inert materials are removed by purging the heating zone with air.

3. The improvement in accordance with claim 1 in which the volatilized inert materials are removed by purging the heating zone with nitrogen.

4. The improvement in accordance with claim 1 in which the volatilized inert materials are removed by pulling a vacuum on the heating zone.

5. A method for generating oxygen which comprises the following steps:
   a. flowing dry air through an absorbent bed of bis(3-fluorosalicylal)ethylenediimine cobalt (II) for a period of about 3 to 5 minutes while maintaining the bed at a temperature below about 100° F;
   b. removing from the absorbent bed a stream of air rich in nitrogen during said period;
   c. at the end of said period heating the absorbent bed for a period of about 3 to 5 minutes while maintaining the bed at a temperature in the range of about 210° to 220° F, thereby desorbing oxygen absorbed by the absorbent bed in step (a);
   d. removing a stream of oxygen from the absorbent bed during the heating period;
   e. sequentially repeating steps (a) and (b) and steps (c) and (d) for a period of about 200 to 300 hours;
   f. at the end of the last-mentioned period heating the absorbent bed at a temperature ranging from about 340° to 390° F for a period of about 15 to 30 minutes, thereby volatilizing volatilizable inert materials formed in the bed during absorption and desorption of oxygen; and
   g. continuously removing volatilized inert materials from the absorbent bed during the heating period.

6. The method according to claim 5 in which the volatilized inert materials are removed by purging the absorbent bed with air.

7. The method according to claim 5 in which the volatilized inert materials are removed by purging the absorbent bed with nitrogen.

8. The method according to claim 5 in which the volatilized inert materials are removed by pulling a vacuum on the absorbent bed.

9. The method according to claim 5 in which the absorbent bed prior to flowing dry air therethrough in step (a) is heated at a temperature ranging from about 340° to 390° F for a period of about 15 to 30 minutes, thereby volatilizing volatilizable inert materials present in the bis(3-fluorosalicylal)ethylenediimine cobalt (II), and the volatilized inert materials are continuously removed from the absorbent bed during the heating period.

* * * * *